G. Page,
Circular Saw Mill.
N° 2,174.  Patented July 16, 1841.
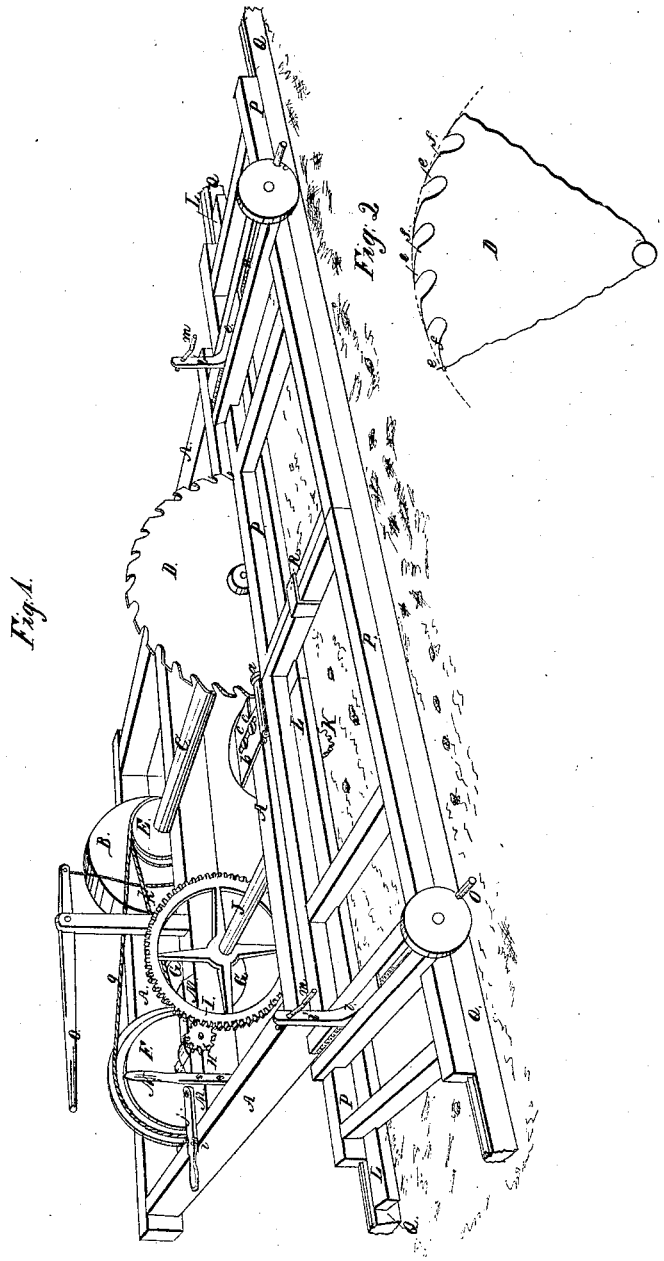

UNITED STATES PATENT OFFICE.

GEO. PAGE, OF BALTIMORE, MARYLAND.

PORTABLE CIRCULAR-SAW MILL.

Specification of Letters Patent No. 2,174, dated July 16, 1841.

*To all whom it may concern:*

Be it known that I, GEORGE PAGE, of the city of Baltimore, in the State of Maryland, have invented certain Improvements in the manner of constructing a sawmill for sawing timber, which I denominate the "Portable Circular-Saw Mill;" and I do hereby declare that the following is a full and exact description thereof.

Figure 1, in the accompanying drawing is a perspective view of my portable saw mill.

A, A, is a square frame which sustains the saw and the driving apparatus; this frame is firmly mortised and bolted together, so that it may be readily lifted from the ground, and placed upon a suitable carriage for transportation; its usual length is about seven feet and a half, and its width four feet and a half.

B, is the driving pulley, to which the motive power of horses is to be applied in any of the ordinary modes; this pulley is placed upon the shaft C, of the circular saw D. The shaft C, has free end play within the boxes in which it runs, so as not, in any case, to have an end bearing against a shoulder; it may, in fact, be a cylinder of the same diameter throughout. The saw is kept in place entirely by the action of two friction rollers, which bear upon its two sides, near its periphery; one of these is seen at *a*, the other being immediately opposite to it. These friction rollers are made adjustable by causing them to revolve on pins which are attached to two plates of metal, placed one upon the other, having tightening screws passing through slots in them, and entering the frame. The uppermost of these plates is marked *b*, and the tightening screws are seen at *c, c*.

The saw D, is made with its teeth in a peculiar form, by which they are enabled to be fed into the timber more deeply than can be done with teeth in the forms usually employed, and the saw may, therefore, be driven with a speed not exceeding one half of the ordinary velocity of such saws; and from this circumstance, combined with the manner of sustaining the saw at its edge, without strain from its center, and with the manner of setting the teeth, it is kept free from all tendency to heating and buckling, and is thereby well adapted to the sawing of ordinary logs, which though frequently attempted by means of the circular saw, has been abandoned from the impossibility of causing the edge of such a saw to run true for any length of time. Fig. 2, shows a portion of my saw, with the manner of forming the teeth; the dotted lines represent the periphery of the circle which the teeth describe, and the line *e, f*, the manner in which the periphery is filed away between two contiguous teeth; which filing away is intended to correspond with the amount of feed given; by which device the saw is made to run with unusual smoothness, and the part cut away, instead of coming out in the ordinary form of saw dust, exhibits, frequently, the appearance of parings, or shavings, five or six inches in length.

The saw is usually about four feet in diameter. The plate is made of the usual spring temper of saw plates, but the points of the teeth I harden to the usual temper of chisels, and other cutting instruments; this is readily effected by heating them between red hot tongs, quenching, and drawing them down to the desired temper; the saw, if desired, may be sharpened by grinding by means of a suitable apparatus, instead of by filing. The teeth are not to be set in the usual way, but are to be upset at the point by means of a punch, which will widen them out, and will enable them to run clear, and to cut unusually clean.

E, is a grooved whirl on the saw shaft, carrying two bands; one of these bands, *g*, passes around the whirl F, and the other, *h*, around the whirl G, the latter band slipping upon the whirl, excepting when the log is to be backed. Upon the shaft of the whirl F, is the pinion H, which gears into the wheel I. The whirl G, is fixed upon the outer end of the shaft J, of this whirl, and the pinion K, upon its inner end. The pinion K, meshes into a rack on the under side of the rack rail L, L, for moving the carriage and log in the ordinary way.

The rapidity of the feed will, of course, be governed by the relative sizes of the whirls, wheel, and pinions, which constitute the gearing, and may be regulated at pleasure.

The whirls E, and G, and the band *h*, are for backing the log, which is done without interrupting the motion of the horses and is effected in the following manner: The pinion H, is to be thrown out of gear with the wheel I; to accomplish this, the box that sustains the ends of the shaft to which the pinion H, is attached is affixed in the sliding piece M, and may be moved back by means of the lever N, and be held by a pin $i$, catching into a notch on the latch piece $j$. The loose band $h$, is then tightened by bearing upon the lever O, which raises a tightening pulley against the lower portion of the band $h$, thus reversing the ordinary motion of the wheel I, and pinion K, and backing the log.

P, P, is the saw carriage and Q, Q, the ways on which it runs. I make the carriage in sections, or lengths, admitting of convenient removal; they need not be longer than the frame A, A, although they are not restricted to any particular length. Two such sections are shown as connected with each other by a clasp, or saddle piece, at R. These sections may either represent a single carriage, as shown in the drawing, the head block being placed upon one of them, and the tail block upon the other; or they may represent two separate carriages connected together by the piece R, and each being furnished with its own proper head and tail block, and carrying distinct logs. I usually employ two carriages in this way, each of which may consist of combined sections. By this means time is much economized, as one of the logs may be set while the other is being sawed. When it is necessary to use a long carriage it may be composed of two sections, only, of ordinary length, by removing them to the proper distance from each other, and connecting them together by an additional rack rail L, L; which manner of combining these parts will have all the effect of a long carriage; said additional rack rail to be secured at its two ends by any convenient means.

The ways Q, Q, upon which the carriage is to run, may be prepared in the words in any place in which the saw mill is to be used, any suitable logs being hewed for that purpose, and the strips of iron $k$, $k$, which constitute the tongue, and upon which the carriage is to slide, being nailed on to them. The carriages may be about three feet in width.

S, S, are the head and tail blocks, which are furnished with dogs, or holdfasts, particularly adapted to this kind of saw mill; $l$, $l'$, is a rectangular piece of iron, the horizontal portion of which, $l$, slides between the cheeks of the head and tail blocks, in grooves prepared for that purpose, and the vertical part $l'$, has a screw $m$, through it, which is turned by a winch, is pointed at its end, and is screwed into the log. The log is to be set by means of a screw $n$, working in a nut on the lower side of the piece $l$, and turned by the handle $o$. If the screws $n$, $n$, have threads of one fourth of an inch, four turns of the handle $o$, will, of course, set the log an inch; and whatever may be the size of the threads, they will serve as perfect gages in the setting, upon the same principle.

Having thus fully described the manner in which I construct my improved portable circular saw-mill, and shown the use and operation of the respective parts thereof, what I claim therein as new, and desire to secure by Letters Patent, is as follows:

1. I claim the manner of affixing and guiding the circular saw, by allowing end play to its shaft, in combination with the means of guiding it by friction rollers embracing it near to its periphery, so as to leave its center entirely unchecked, laterally. I do not claim the use of friction rollers embracing and guiding the edge of a circular saw, these having been previously used for that purpose, but I limit my claim to their use in combination with a saw having free lateral play at its center.

2. I claim the particular manner in which I have applied said friction rollers by attaching the pins, or pivots, upon which they are sustained and revolve, to two plates of metal placed upon each other, and both held by the same set screws, as set forth.

3. I claim the manner of forming a long carriage from two short sections by coupling, or uniting, said sections by means of the rack-rail only, as described.

GEO. PAGE.

Witnesses:
THOS. P. JONES,
THOS. COPELAND.